(12) United States Patent
Bivens et al.

(10) Patent No.: US 8,311,577 B2
(45) Date of Patent: Nov. 13, 2012

(54) PROACTIVE CONTROL OF MOBILE COMMUNICATIONS DEVICES

(75) Inventors: John Allan Bivens, Ossining, NY (US); Joel W. Branch, Hamden, CT (US); Daby Mousse Sow, Riverdale, NY (US)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 12/484,467

(22) Filed: Jun. 15, 2009

(65) Prior Publication Data

US 2010/0317400 A1   Dec. 16, 2010

(51) Int. Cl.
*H04M 1/00* (2006.01)
(52) U.S. Cl. ...................... 455/556.1; 455/565
(58) Field of Classification Search ............... 455/414.1, 455/556.1, 550.1, 575.1, 565; 345/173, 174, 345/175, 169, 156
See application file for complete search history.

(56) References Cited

U.S. PATENT DOCUMENTS

| | | | |
|---|---|---|---|
| 7,099,684 B2 * | 8/2006 | Cowsky et al. ............ | 455/550.1 |
| 7,319,390 B2 | 1/2008 | Takasuka | |
| 7,382,359 B2 * | 6/2008 | Griffin ......................... | 345/169 |
| 7,813,774 B2 * | 10/2010 | Perez-Noguera .......... | 455/575.1 |
| 7,924,268 B2 * | 4/2011 | Kavounas .................. | 345/169 |
| 2006/0005156 A1 | 1/2006 | Korpipaa et al. | |
| 2007/0120965 A1 | 5/2007 | Sandberg et al. | |
| 2008/0032680 A1 | 2/2008 | Dam Nielsen | |
| 2010/0255820 A1 * | 10/2010 | Maly et al. ................. | 455/414.1 |

FOREIGN PATENT DOCUMENTS

JP    2005269567    9/2005

OTHER PUBLICATIONS

Dragovic, B., et al, Information Exposure Control Through Data Manipulation for Ubiquitous Computing, Proceedings of the 2004 Workshop on New Security Paradigms, 2004.

* cited by examiner

*Primary Examiner* — Kent Chang
*Assistant Examiner* — Nelson Rosario
(74) *Attorney, Agent, or Firm* — Ference & Associates LLC

(57) ABSTRACT

At least one embodiment of the invention addresses the problem of accidental user operation (e.g., dialing) of a mobile communication device such as a mobile telephone. In this regard, embodiments of the invention provide a proactive solution for preventing unintended operation of a mobile device based on various types of input data of the device, most notably sensory data.

17 Claims, 7 Drawing Sheets

PROACTIVE CONTROL OF MOBILE COMMUNICATIONS DEVICES

BACKGROUND

The field of the invention is systems, methods and arrangements for controlling mobile electronic devices.

As the amount and type of mobile electronic devices (e.g. mobile/cellular telephones, PDAs, mobile computing and gaming devices, etc.) increases, the corresponding user applications also increase. Accordingly, there has been a great increase in the functionality of mobile electronic devices. The general trend of decreasing the size of mobile electronic devices and the amount and type of applications available to users has created considerable difficulty for users in several areas.

For example, accidental user operation of the mobile device can be a problem. Accidental user operation of a mobile communication device usually occurs when a series of input keys or a "shortcut" key on the device is pressed and a device function (e.g., phone call) is initiated while the device is enclosed in a space such as a pocket or purse without the user's knowledge. Such accidental operations are unintentional and therefore problematic.

The inventors have recognized that accidental user operation can cause, for example, the following problems: (i) unnecessary use of a device's resources (e.g., energy); (ii) unnecessary use of a communication network's resources (e.g., bandwidth); (iii) inconvenience on the part of the receiving party if a call is placed (e.g., answering unintended calls and checking/erasing long and meaningless voice mail messages); (iv) unnecessary use of valuable public safety services if a call is placed (e.g., operators fielding accidental calls to police departments and 911 call centers). With the increasing popularity of mobile electronic devices, the frequency with which these problems are encountered is likely to increase.

Currently, there exist several unsatisfactory solutions to this problem. The first, and most widely known, solution is a keypad lock mechanism, which prevents a mobile device from being operated unless a unique key or sequence of keys is pressed first to unlock the device. A second solution involves monitoring the user's communication session if the accidental operation resulted in a phone call. This may involve monitoring the session for silence or unresponsiveness.

Accordingly, the inventors have recognized a need for improving mobile electronic devices to prevent accidental user operation.

BRIEF SUMMARY

One or more embodiments of the invention pertains to systems, methods and arrangements for proactively controlling mobile communications devices based on sensory feedback data. At least one presently preferred embodiment broadly contemplates systems, methods and arrangements for improving user interfaces of mobile electronic devices. At least one aspect of the invention addresses the problem of accidental user operation (e.g., dialing) of a mobile communication device such as a mobile telephone. In this regard, an embodiment of the invention provides a proactive solution for preventing unintended operation of a mobile device based on various types of input data of the device, most notably sensory data.

In summary, one aspect of the invention provides an apparatus comprising: one or more sensors; one or more processors; and a computer readable storage medium having computer readable program code embodied therewith the computer readable program code, executable by the one or more processors, comprising: computer readable program code configured to enable receiving input relating to one or more user actions; computer readable program code configured to determine, via a learning system, if the one or more user actions is unintentional based on the input; and computer readable program code configured to prevent execution of the one or more user actions if it is determined that the one or more user actions is unintentional; wherein the input comprises one or more of main device inputs, peripheral device inputs, and sequential user inputs.

Another aspect of the invention provides a method comprising: receiving input relating to one or more user actions at a mobile electronic device; determining, via a learning system, if the one or more user actions is unintentional based on the input; and preventing execution of the one or more user actions if it is determined that the one or more user actions is unintentional; wherein the input comprises one or more of main device inputs, peripheral device inputs, and sequential user inputs.

A further aspect of the present invention provides a computer readable storage medium having computer readable program code embodied therewith, the computer readable program code comprising: computer readable program code configured to enable receiving input relating to one or more user actions; computer readable program code configured to determine, via a learning system, if the one or more user actions is unintentional based on the input; and computer readable program code configured to prevent execution of the one or more user actions if it is determined that the one or more user actions is unintentional; wherein the input comprises one or more of main device inputs, peripheral device inputs, and sequential user inputs.

For a better understanding of the present invention, together with other and further features and advantages thereof, reference is made to the following description, taken in conjunction with the accompanying drawings, and the scope of the invention will be pointed out in the appended claims.

DETAILED DESCRIPTION

Figure 1:
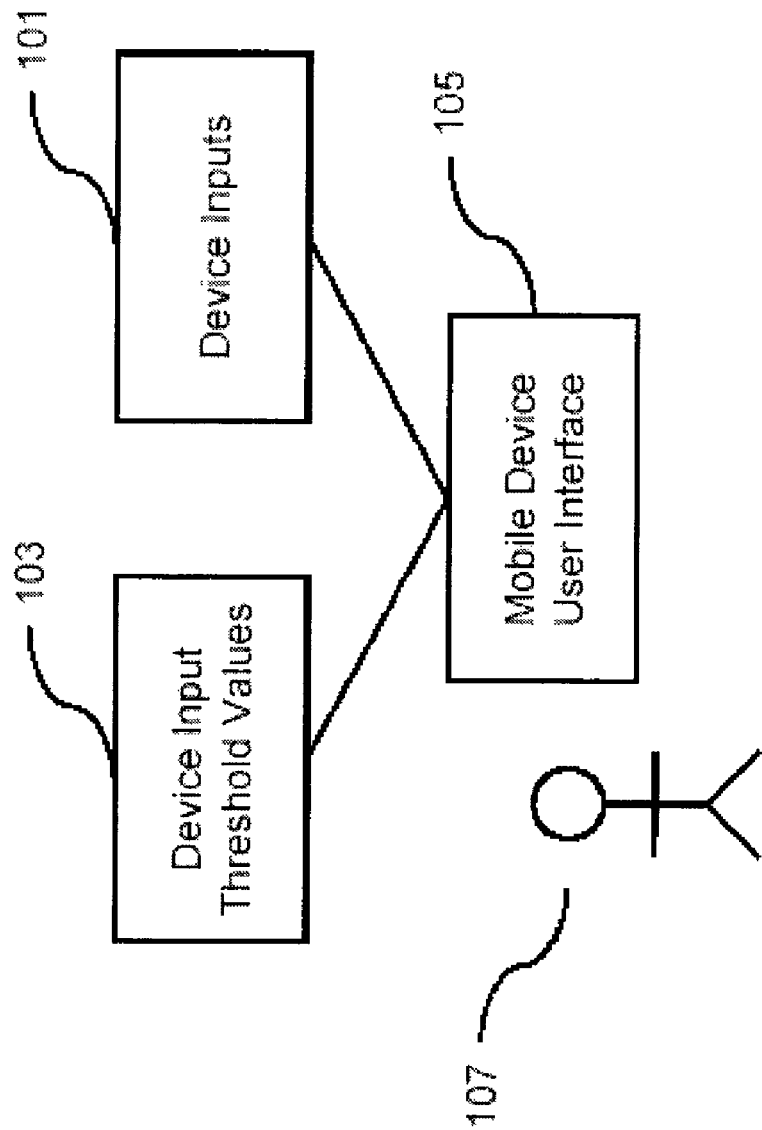
FIG. 1 illustrates architecture for controlling the usage of a mobile device using device inputs.

It will be readily understood that the components of the embodiments of the present invention, as generally described and illustrated in the figures herein, may be arranged and designed in a wide variety of different configurations in addition to the described presently preferred embodiments. Thus, the following more detailed description of the embodiments of the present invention, as represented in the figures, is not intended to limit the scope of the invention, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the embodiments of the invention.

The illustrated embodiments of the invention will be best understood by reference to the drawings. The following description is intended only by way of example, and simply illustrates certain selected presently preferred embodiments of the invention as claimed herein.

At least one embodiment of the invention addresses the problem of accidental user operation (e.g., dialing) of a mobile electronic device (also referred to herein as mobile device, device, and the like). Common examples of mobile electronic devices include mobile telephones, mobile computing devices, mobile gaming devices, etc. In this regard, an embodiment of the invention provides a proactive solution for preventing unintended operation of a mobile electronic device based on various types of input data of the device, most notably sensory data.

As mentioned above, conventional solutions for preventing unintended operation of a mobile electronic device include a keypad lock mechanism and communication session monitoring. Unfortunately, many users neglect to activate this lock mechanism before stowing the device and in some cases, a device may accidentally be unlocked while stowed. The problem with communication session monitoring is that it is applied after the communication session has been initiated, already wasting resources (e.g. bandwidth or a 911 operator's time). A third solution involves using sensory measurements performed by the device in order to confirm user intentions before committing the user operation. While this solution is proactive, it has heretofore been limited to sensory measurements either solely related to the device's keypad (e.g., detection of skin-key contact) or the device's physical orientation.

Accordingly, at least one presently preferred embodiment of the invention provides a more robust proactive solution for preventing unintended/accidental user operation based on sensory data gathered at the device. In providing this proactive solution, an embodiment of the invention generally focuses on two major premises. First, many current and future mobile devices are or will be capable of collecting sensory measurements (e.g., temperature, orientation, light, and of course sound) using standard, integrated components. Second, on average, many users operate their devices under certain typical conditions described by these sensory measurements. For instance, intended operation usually occurs under certain lighting conditions (possibly indicating whether or not the device is stowed) and within a limited range of device orientations (possibly indicating whether or not the device is being held by its usual user).

Beyond sensory data, intended device operation may be characterized using additional methods of input. For instance, in using a smart phone, a user may always call a certain contact by typing her name and using the phone's auto-complete function to assist in the calling operation. Dialing this contact via other means, e.g., a speed dial, may indicate uncharacteristic and therefore, unintended usage.

Inputs from peripheral devices may be considered as well. For instance, uncharacteristic input from a device such as a Bluetooth® short-range wireless technology enabled accessory should be considered in the case that the main mobile device is physically in a state which would characterize operation as intended.

The goal is to use a combination and/or a sequence of these device and peripheral inputs and employ machine learning techniques to probabilistically associate a range of input values with intended, or legitimate, device operations. If it is determined that the operation is unintended (i.e., occurring outside a condition of normalcy), then as a safeguard, the user may be prompted to pass an additional challenge to complete the perceived operation. This may include requiring the input of a unique key sequence or voice command.

In this regard, one advantage of the presently preferred embodiments of the invention over conventional solutions is the inclusion of a wide range of sensor measurements, main device and peripheral inputs, and the consideration of sequential inputs in order to predict more accurately whether a mobile device's operation is intentional (i.e. corresponds to the user's desires).

Another associated advantage is the use of machine learning analysis (e.g. a machine learning algorithm), which customizes the overall method to individual user behaviors. This customization is greatly beneficial in such cases where, for example, a user might hold her mobile phone in a more upright position and close to her face to compensate for poor vision.

Referring now to the figures, at least one presently preferred embodiment will be described in a non-limiting and exemplary fashion and the scope of the invention will be pointed out in the appended claims.

FIG. 1 is a block diagram illustrating exemplary architecture upon which conventional device input-based methods for mobile device control art are implemented. Component 101 defines a (set of) component(s) that are used to collect sensory data (e.g., microphones, cameras, heat sensors, etc.) and other data (e.g., from keypads). Component 103 defines a (set of) threshold value(s) that define limits beyond which device input values from component 101 indicate a device state in which intended device operation is least likely to occur.

Component 105 defines an interface through which a user interacts with the mobile device. It is possible that component 105 can contain some or all of the underlying components represented by component 101. For instance, galvanic skin sensors may reside in the keypad of a device. The current state of the art does not indicate how the threshold values of component 103 are defined or updated.

Figure 2:
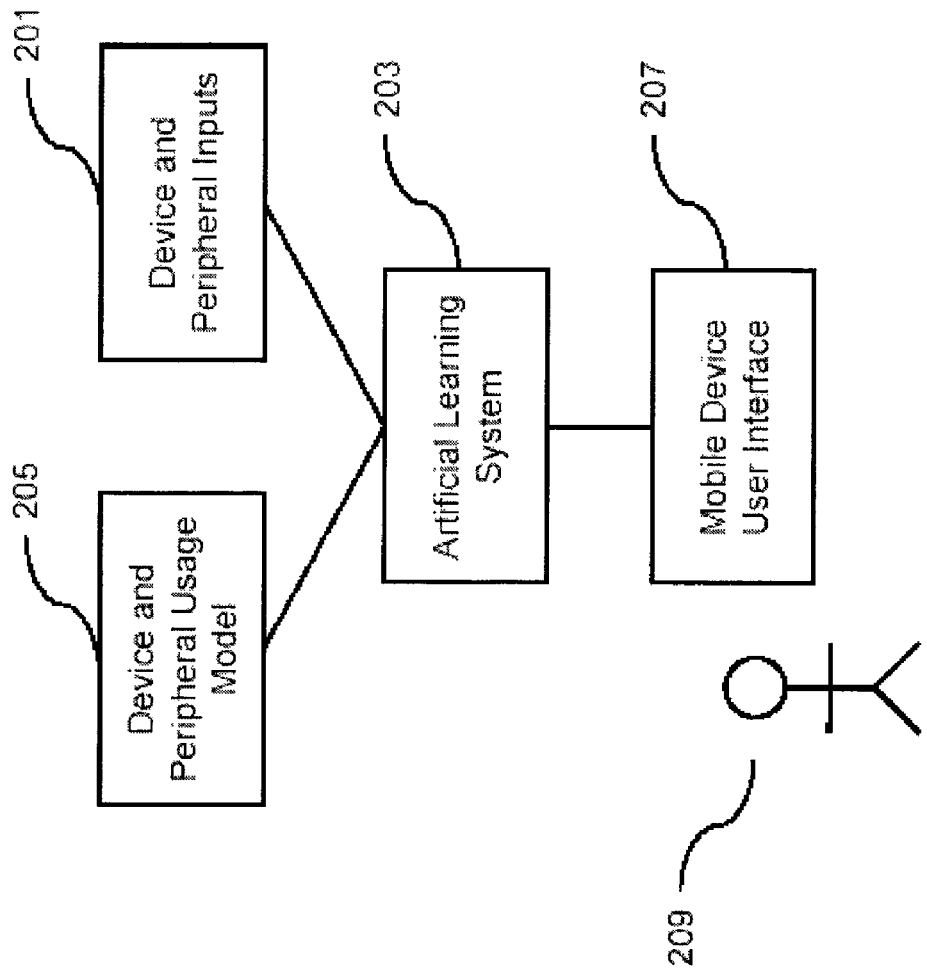
FIG. 2 illustrates architecture used for proactively controlling the usage of a mobile device using a machine learning component according to one embodiment of the invention.

FIG. 2 is a block diagram illustrating exemplary architecture for providing a device/peripheral input-based and machine learning-assisted method for mobile device control using one embodiment of the invention. Component 201 defines a (set of) component(s) that are used to collect device/ peripheral input data. Component 207 defines an interface through which a user interacts with the mobile device. Again, it is possible that component 207 can contain some or all of the underlying components represented by component 201. Component 203 defines a machine learning system that is used to train a mechanism (e.g., neural network, decision tree, support vector machine) to predict intended operation of (a specific function of) the device based on prior and current samples from component 201 and currently attempted device operation via component 207.

Essentially, component 203 categorizes sequences and combinations of device/peripheral input data values as that representing (various degrees of) intended or non-intended device operation. Component 205 is a device usage model describing conditions (as defined by data values produced by component 201) under which legitimate device usage is defined. For example, the model may define under what combination of lighting, heat, ambient sound, physical orientation, and time values that intended device operation usually occurs. The categorization of data values need not be limited to discrete values (e.g., intended and unintended); they could exist over a continuous domain. Using the latter scheme, the "probability" of a detected device's operation being intended may be defined instead. Component 205 is both created and updated by the component 203.

Figure 3:
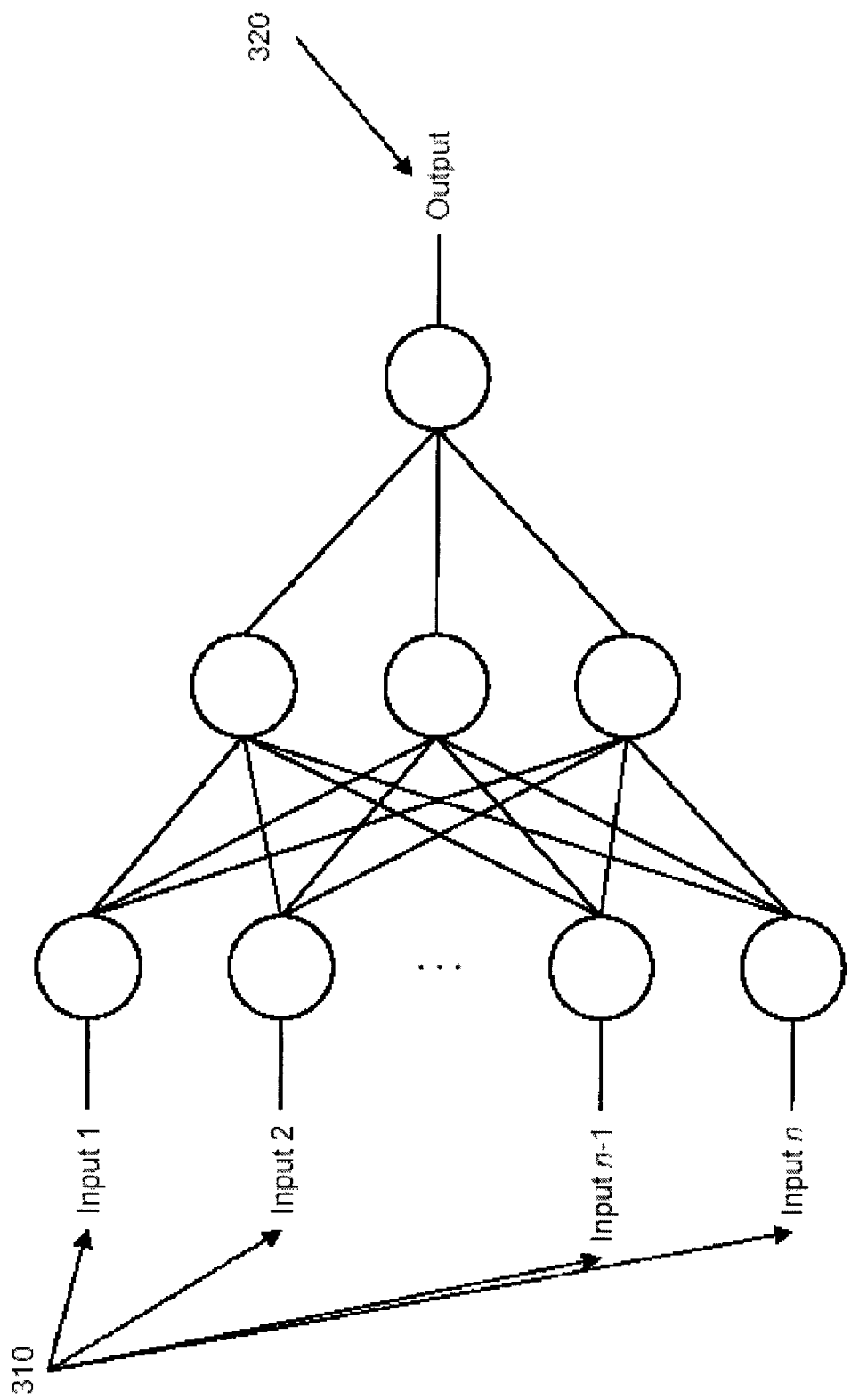
FIG. 3 illustrates a neural network for providing machine learning for the mobile device according to one embodiment of the invention.

FIG. 3 illustrates an exemplary learning system (an artificial neural network) which could be used as the learning system referred to by label 203. In FIG. 3, the inputs to the learning model 310 would represent a normalized value of the available sensory and other data (e.g., sound, orientation, heat, keypresses, etc.). For example, if Input 1 to the neural network was the sound input (InputSound), InputSound could be normalized to a value between 0.0 and 1.0 through the following formula:

$$Input_{Sound} = \frac{Sound_{Measured}}{Sound_{MAX} - Sound_{MIN}}$$

where:
SoundMeasured: the current measured value of sound (e.g. in decibels).
SoundMAX: the highest measured value of sound (e.g. in decibels).
SoundMeasured: the lowest measured value of sound (e.g. in decibels).

A sequence of inputs (e.g. sound over several time intervals) could be represented by having an input neuron for each input at each time interval. The output used during training phases are values indicating whether the input was from a case of intentional versus unintentional usage (could be 0 for intentional and 1 for unintentional).

In this exemplary learning system, the weights of the neural network would change during learning cycles to create a model by which the learning system could produce output values which would be compared to a threshold to determine if the corresponding input parameters were from intentional or unintentional use of the mobile device. This embodiment only describes an exemplary method of such a learning system. Other mathematical methods could be used to normalize the input and interpret the output or an entirely different learning system could be used as a component of this embodiment.

Figure 4:
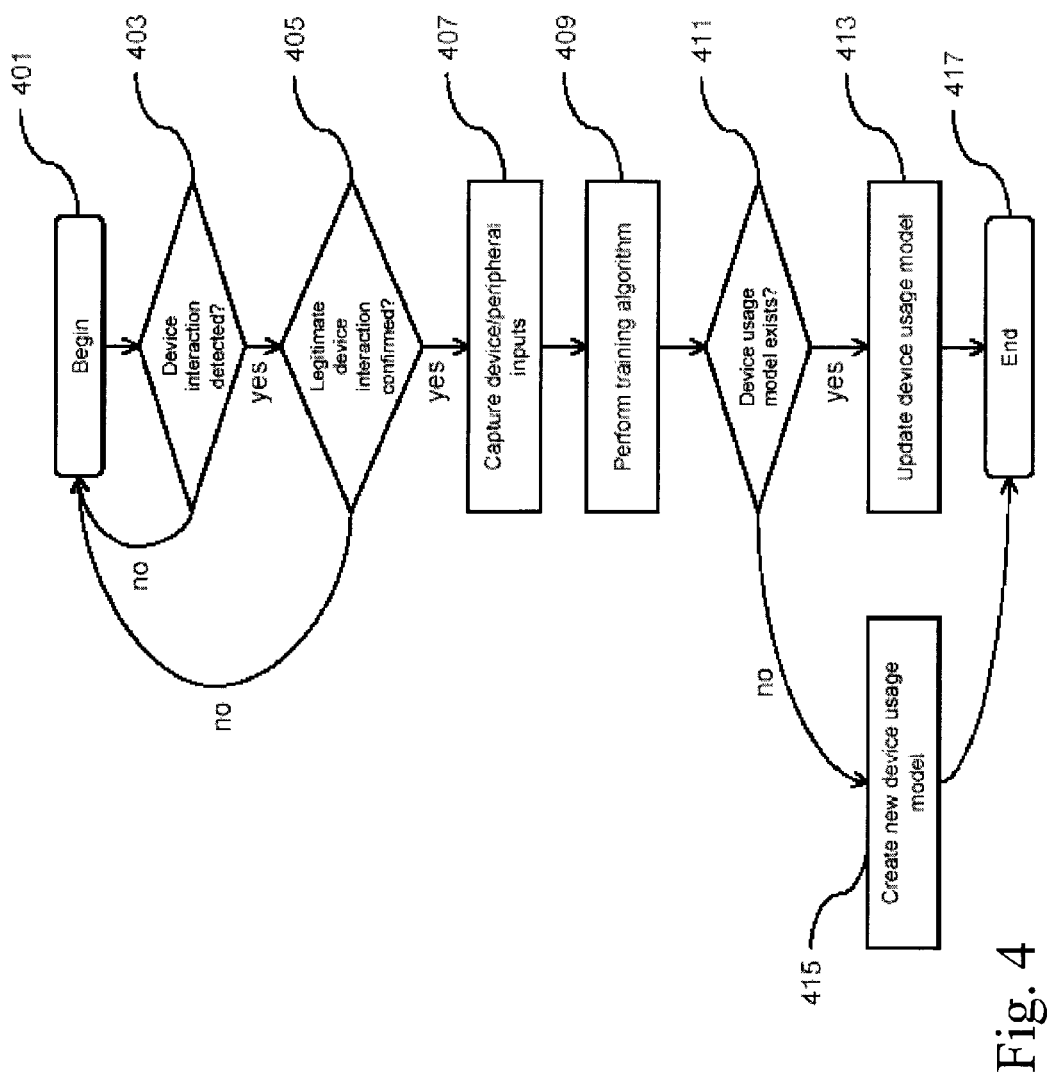
FIG. 4 illustrates a method of training the machine learning component using user feedback according to one embodiment of the invention.

FIG. 4 illustrates the steps executed to train the machine learning component, which begins at the initial step 401. In one embodiment, it is expected that this training process occur at the user's request, or periodically in an automatic manner. The training process waits to start until device interaction is detected as shown in step 403. Examples of device interaction include a speed dial key press, voice command, or gesture command (i.e., gesturing in front of an integrated video camera). Immediately upon the detection of device interaction, its legitimacy is explicitly confirmed, as shown in step 405. The operation of confirming intended device interaction can be implemented via prompting the user to confirm the operation's legitimacy via the device user interface (e.g., press the "#" key to confirm). If, by any means, that intended device interaction is unconfirmed, then the process returns to the begin state at step 401.

Otherwise, the process proceeds to step 407, which involves the capture of device/peripheral input data. It should be noted that this step involves the capture of data occurring within a small temporal window surrounding step 403. Hence, step 407 may involve the capture of data occurring before or after step 403. These data values are then used to train the machine learning mechanism as shown in the step 409.

Regarding the availability of device/peripheral usage models, two scenarios may occur: (1) a default model is included in the device prior to its delivery to the user, or (2) no initial model exists. In the latter case, the training process creates a new usage model, as shown in step 415. Otherwise, the model is updated according to the type and parameters of the employed machine learning mechanism, as shown in step 413.

After training is complete, the process ends at step 417. It should be noted that FIG. 4 illustrates an iterative training process. Additionally, a batch training process could be used where input data is collected within a certain period (e.g., a week), after which legitimate device interaction is confirmed for all sets of input in a batch processing manner.

Figure 5:
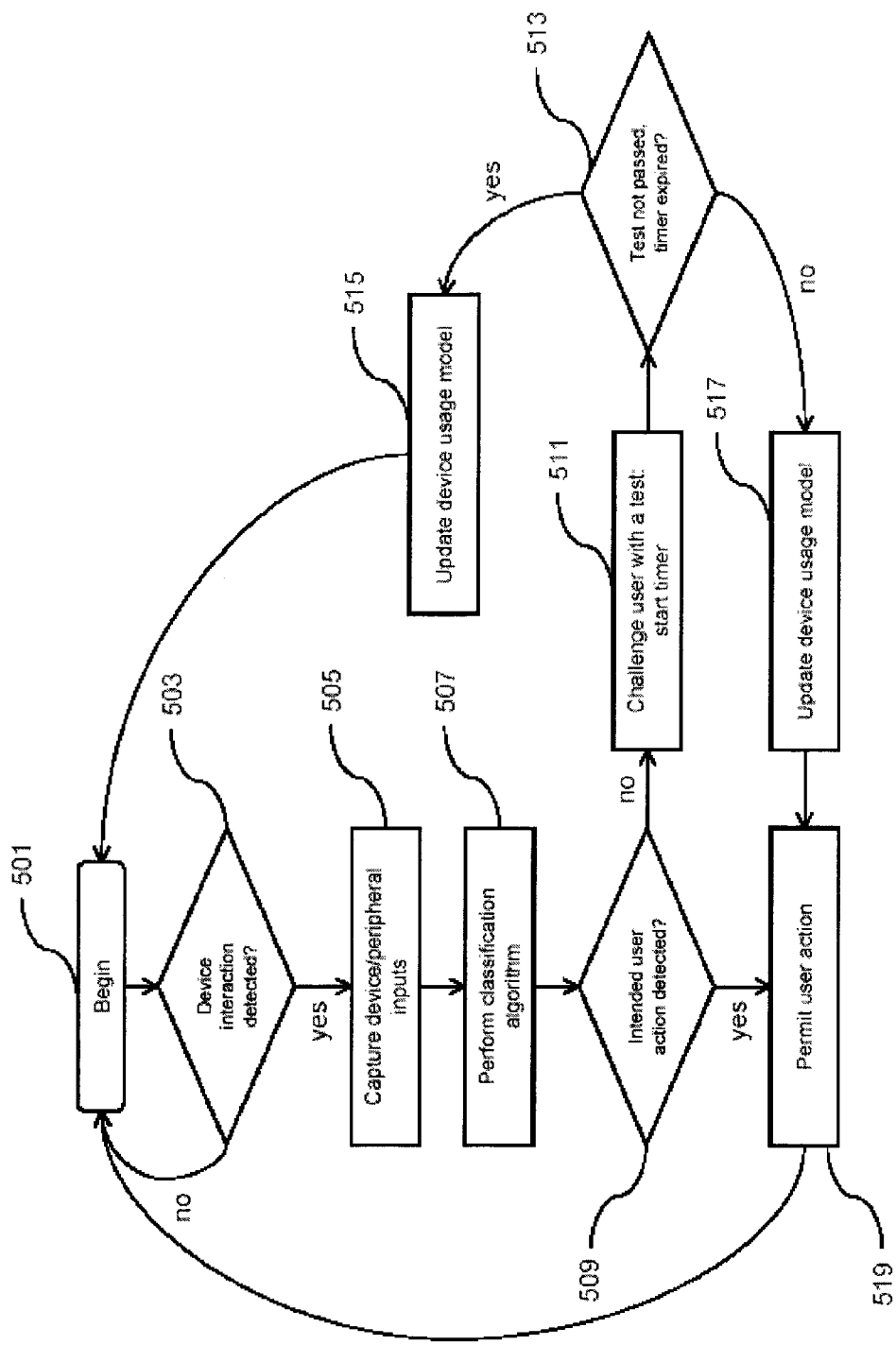
FIG. 5 illustrates a method of detecting unintended usage of a mobile device according to one embodiment of the invention.

FIG. 5 illustrates exemplary steps executed in using the trained machine learning mechanism to infer intended usage of a mobile device. The process starts at step 501. Upon detecting some method of device interaction, as shown in step 503, device/peripheral data inputs are captured, as shown in step 505. In order to determine the legitimacy of the device interaction, the machine learning mechanism referenced in FIG. 3 and FIG. 4 initiates a classification algorithm using as inputs the data values acquired in the previous step and the most up to date device usage model, as shown in step 507.

Given these inputs, the algorithm classifies the device interaction in step 509 as being intended or non-intended. However, a probabilistic decision may be given as well. So, in this embodiment, if the device interaction is judged to be "sufficiently" intended, then it is permitted, as shown in step 519 and the process returns to the start step 501.

Additionally, at step 509, a record of the device interaction and its classification as "intended" may be kept. At some point, a user may inspect this record and manually mark mis-classified interactions as unintended. This can then be used to train the machine learning algorithm to reduce the occurrence of false-positives.

If the classification algorithm does not determine the interaction to be sufficiently intended, then the process traverses to step 511, where the user is challenged with a test via the device's interface (e.g., the screen) and a countdown timer is started. The primary intent of this test is two-fold: to actively gather feedback from the user in order to continuously train the machine learning mechanism and to provide accurate device usage predictions to, for example, reduce unintended calls. The process needed to complete the test need not be too complex, but it should be chosen such that the test cannot be easily passed via some accidental input. For example, a test could consist of entering a special user-defined code via the keypad. This helps prevent a scenario such as a mobile phone residing in a pocket while a speed dial key is pressed, the collected sensory data causing the classification algorithm to predict the action as being accidental, and then the passing of the aforementioned test via another simple accidental key press.

Additionally, if the classification algorithm outputs a probabilistic answer, then the complexity of the test may be correlated with the probability. For example, the lower the probability of intended user action (below some threshold above which user action is judged as intended), the more complex the test will be. Furthermore, the output of the classification algorithm can be interpreted stricter or more lenient based on the user's sensitivity to unintended usage.

If the test is not passed, or the timer expires (whichever happens first), as shown in step 513, then the device usage model is updated, as shown in step 515, and the process returns to the start step. If the opposite is true, then the device usage model is still updated, as shown in step 517, and the user action is permitted. Hence, either way, the machine learning mechanism is further trained in an attempt to provide more accurate predictions. The user feedback process need not occur consistently, but may be employed periodically at a rate that is most convenient for the user.

Figure 6:
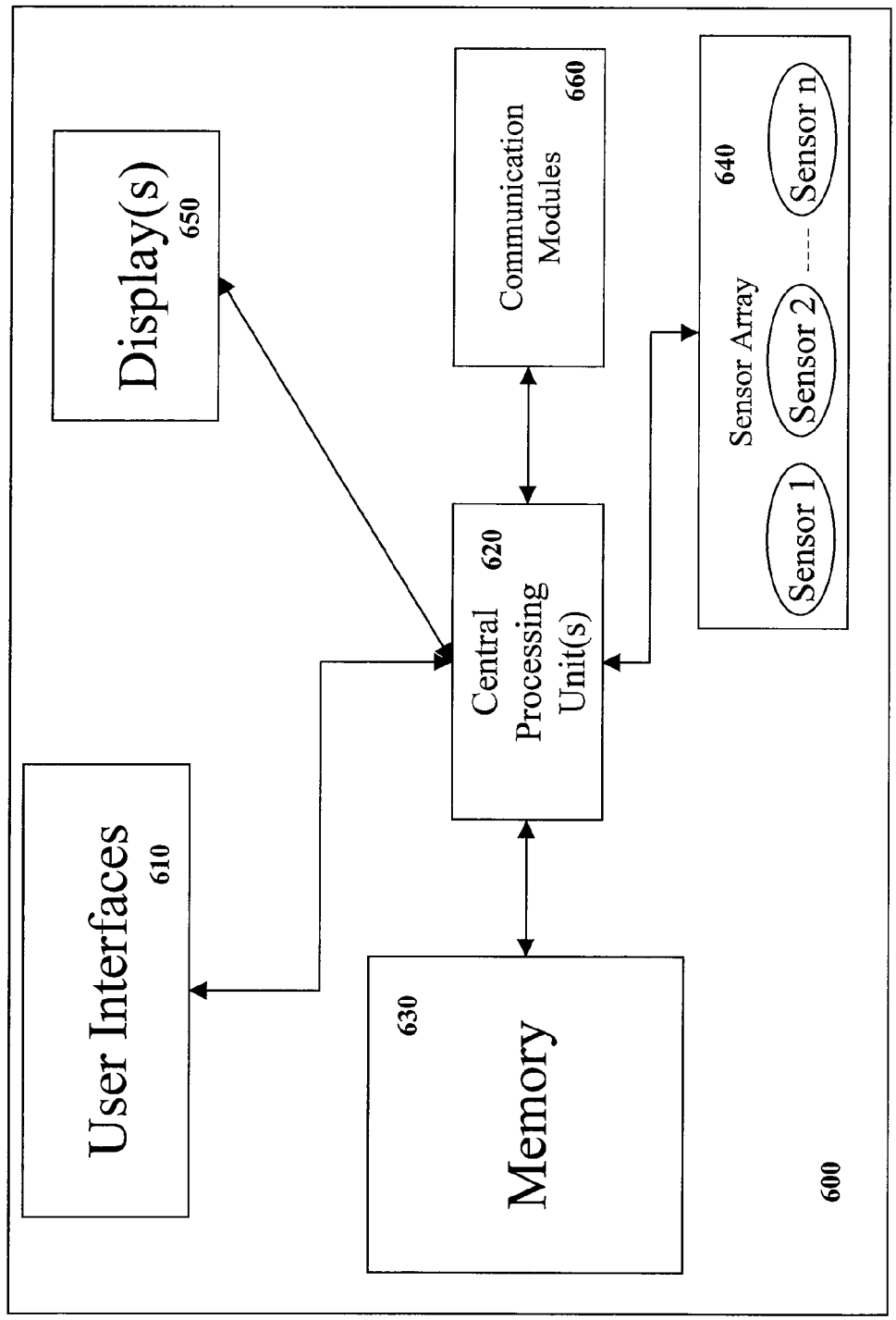
FIG. 6 illustrates an exemplary mobile electronic device according to one embodiment of the invention.

FIG. 6 illustrates an exemplary mobile electronic device 600. As shown, the device includes user interface(s) 610 operatively coupled to central processing unit(s) 620. The device contains memory 630, also operatively coupled to the central processing unit 620. The device will receive inputs from sensor(s) 1 . . . n (e.g. light, heat, galvanic, etc.) via a sensor array 640. The device includes at least one display 650 and communications modules 660, allowing the device to display documents (e.g. a web page) obtained from remote sources (e.g. via a networked connection).

Figure 7:
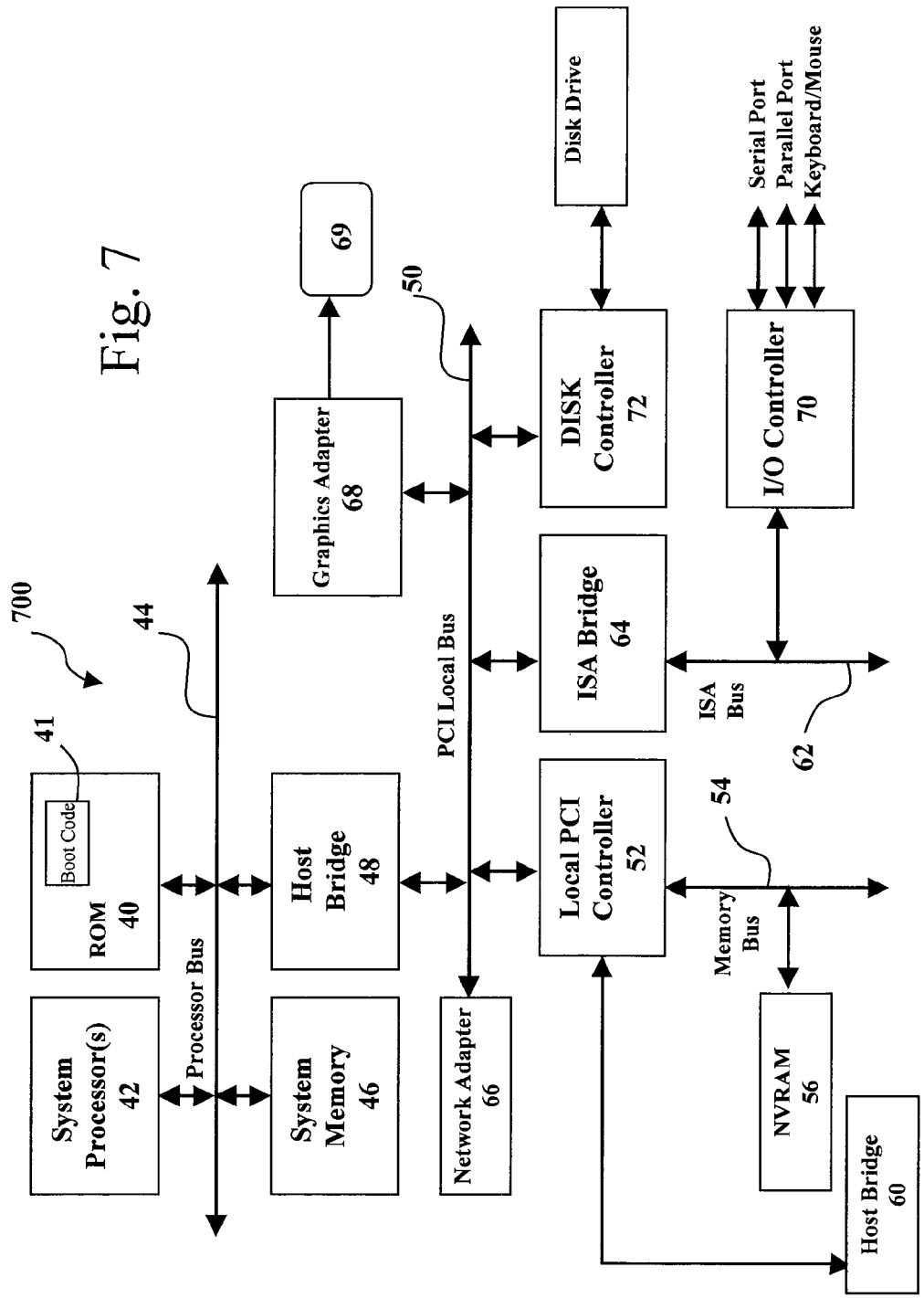
FIG. 7 illustrates an exemplary mobile electronic device according to one embodiment of the invention.

Referring now to FIG. 7, there is depicted a block diagram of an illustrative embodiment of a mobile computing device 700. The illustrative embodiment depicted in FIG. 7 may be mobile computing device such as a smart phone or other computing device. As is apparent from the description, however, the present invention is applicable any appropriately configured computing device, as described herein.

As shown in FIG. 7, computer system 700 includes at least one system processor 42, which is coupled to a Read-Only Memory (ROM) 40 and a system memory 46 by a processor bus 44. System processor 42, which may comprise one of the processors produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 700 to LAN 10, and graphics adapter 68, which interfaces computer system 700 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 700 further includes Industry Standard Architecture (ISA) bus 62, which is coupled to PCI local bus 50 by ISA bridge 64. Coupled to ISA bus 62 is an input/output (I/O) controller 70, which controls communication between computer system 700 and attached peripheral devices such as a keyboard, mouse, and a disk drive. In addition, I/O controller 70 supports external communication by computer system 700 via serial and parallel ports. The USB Bus and USB Controller (not shown) are part of the Local PCI controller (52).

In brief recapitulation, at least one presently preferred embodiment of the invention provides proactive solutions for preventing unintended operation of a mobile electronic device. At least one presently preferred embodiment the invention provides artificial intelligence to intelligently determine if a user action is intentional and thus prevent unintentional user operations.

Again, the Figures illustrate one or more presently preferred embodiments but are presented for illustration purposes and not for limitation. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus comprising:
   one or more sensors;
   one or more processors; and
   a computer readable storage medium having computer readable program code embodied therewith, the computer readable program code, executable by the one or more processors, comprising:
     computer readable program code configured to enable receiving input relating to one or more user actions;
     computer readable program code configured to determine, via a learning system, if the one or more user actions is intentional or unintentional based on the input; and
     computer readable program code configured to prevent execution of the one or more user actions if it is determined that the one or more user actions is unintentional and unconfirmed within a time period, and allow execution of the one or more user actions if it is determined that the one or more user actions is intentional or unintentional and confirmed within the time period;
   wherein the input comprises one or more of main device inputs, peripheral device inputs, and sequential user inputs;
   wherein the computer readable program code is further configured to train the learning system based on the inputs;
   wherein to train the learning system based on the input comprises:
     detecting the input; and
     performing training for unintentional input responsive to determining that the input is unintentional, wherein training for unintentional input comprises:
       prompting a user with a challenge after detecting the input;
       determining that the input is unintentional if the challenge is not met;
       determining that the input is intentional if the challenge is met;
       capturing parameters related to the input if the challenge is met; and
       performing one of:
         updating an existing device usage model; and
         creating a new device usage model responsive to an absence of an existing device usage model.

2. The apparatus according to claim 1, wherein the challenge is not met if the user does not respond to the challenge within a predetermined time.

3. The apparatus according to claim 1, wherein the challenge is not met if the user provides inappropriate feedback in response to the challenge.

4. The apparatus according to claim 1, wherein the learning system comprises a neural network.

5. The apparatus according to claim 1, wherein the learning system comprises a decision tree.

6. The apparatus according to claim 1, wherein the learning system comprises a support vector machine.

7. The apparatus according to claim 1, wherein the apparatus is a mobile telephone.

8. The apparatus according to claim 1, wherein to train the learning system based on the input comprises:
  detecting the input; and
  performing training for intentional input responsive to determining that the input is intentional, wherein training for the intentional input comprises:
    capturing inputs;
    classifying inputs as intentional; and
    performing one of:
      updating an existing device usage model; and
      creating a new device usage model responsive to an absence of an existing device usage model.

9. A method comprising:
  receiving input relating to one or more user actions at a mobile electronic device;
  determining, via a learning system, if the one or more user actions is intentional or unintentional based on the input;
  preventing execution of the one or more user actions if it is determined that the one or more user actions is unintentional and unconfirmed within a time period, and allow execution of the one or more user actions if it is determined that the one or more user actions is intentional or unintentional and confirmed within the time period; and
  training the learning system based the input;
  wherein the input comprises one or more of main device inputs, peripheral device inputs, and sequential user inputs;
  wherein the training comprises:
  detecting the input; and
  performing training for unintentional input responsive to determining that the input is unintentional, wherein training for unintentional input comprises:
    prompting a user with a challenge after detecting the input;
    determining that the input is unintentional if the challenge is not met;
    determining that the input is intentional if the challenge is met;
    capturing parameters related to the input if the challenge is met; and
    performing one of:
      updating an existing device usage model; and
      creating a new device usage model responsive to an absence of an existing device usage model.

10. The method according to claim 9, wherein the challenge is not met if the user does not respond to the challenge within a predetermined time.

11. The method according to claim 9, wherein the challenge is not met if the user provides inappropriate feedback in response to the challenge.

12. The method according to claim 9, wherein the learning system comprises a neural network.

13. The method according to claim 9, wherein the learning system comprises a decision tree.

14. The method according to claim 9, wherein the learning system comprises a support vector machine.

15. The method according to claim 9, wherein the mobile electronic device is a mobile telephone.

16. The method according to claim 9, wherein the training comprises:
  detecting the input; and
  performing training for intentional input responsive to determining that the input is intentional, wherein training for the intentional input comprises:
    capturing inputs;
    classifying inputs as intentional; and
    performing one of:
      updating an existing device usage model; and
      creating a new device usage model responsive to an absence of an existing device usage model.

17. A non-transitory computer readable storage medium having computer readable program code embodied therewith, the computer readable program code comprising:
  computer readable program code configured to enable receiving input relating to one or more user actions;
  computer readable program code configured to determine, via a learning system, if the one or more user actions is unintentional based on the input;
  computer readable program code configured to prevent execution of the one or more user actions if it is determined that the one or more user actions is unintentional and unconfirmed within a time period, and allow execution of the one or more user actions if it is determined that the one or more user actions is intentional or unintentional and confirmed within the time period; and
  computer readable program code configured to train the learning system based on the input;
  wherein the input comprises one or more of main device inputs, peripheral device inputs, and sequential user inputs;
  wherein to train the learning system based on the input comprises:
    detecting the input; and
    performing training for unintentional input responsive to determining that the input is unintentional, wherein training for unintentional input comprises:
      prompting a user with a challenge after detecting the input;
      determining that the input is unintentional if the challenge is not met;
      determining that the input is intentional if the challenge is met;
      capturing parameters related to the input if the challenge is met; and
      performing one of:
        updating an existing device usage model; and
        creating a new device usage model responsive to an absence of an existing device usage model.

* * * * *